United States Patent [19]
Ohishi et al.

[11] Patent Number: 5,909,257
[45] Date of Patent: Jun. 1, 1999

[54] APPARATUS AND METHOD OF RECEIVING BROADCASTED DIGITAL SIGNAL

[75] Inventors: Takeo Ohishi, Yokohama; Tomoyuki Shindo, Yamato; Yutaka Tanaka, Yokosuka, all of Japan

[73] Assignee: Victor Company of Japan, Ltd., Yokohama, Japan

[21] Appl. No.: 08/810,994

[22] Filed: Feb. 27, 1997

[30] Foreign Application Priority Data

Feb. 27, 1996 [JP] Japan ........................................ 8-65464
Feb. 28, 1996 [JP] Japan ........................................ 8-69337

[51] Int. Cl.$^6$ .................................................... H04N 5/76
[52] U.S. Cl. ................................... 348/726; 348/6; 348/9
[58] Field of Search ............................... 386/83, 97, 124; 348/6, 9, 385, 386, 387, 553, 726; 360/5, 48, 18, 69, 94.1, 60, 106.1, 86; H04N 5/76

[56] References Cited

U.S. PATENT DOCUMENTS 5,619,337  4/1997  Naimpally .................................. 386/83

*Primary Examiner*—Nathan Flynn
*Attorney, Agent, or Firm*—Jacobson, Price, Holman & Stern, PLLC

[57] ABSTRACT

A digital TV broadcasting signal is demodulated to obtain a bit stream containing at least a first packet of a first program specific information concerning all TV programs conveyed by the digital TV broadcasting signal and first packets of the TV programs themselves. Selection data is entered for selecting at least one of the TV programs. In response to the selection data, only second packets are selected from among the first packets. The second packets contain only data of the selected TV program. The second packets are decoded. Further, the first packet and the second packets are output without decoding and accepted. The first program specific information is modified into a second program specific information concerning the selected at least one of the TV programs. The modification is executed after the first packet and the second packets are output. Or, the modification is executed before the first packet and the second packets are accepted.

8 Claims, 15 Drawing Sheets

FIG.9A
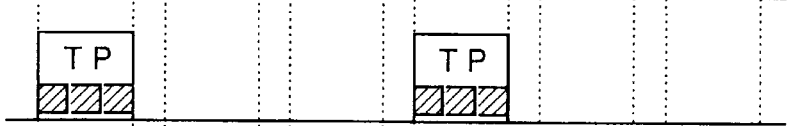
FIG.9B
FIG.9C
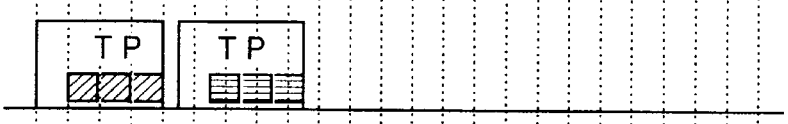
FIG.9D
FIG.9E
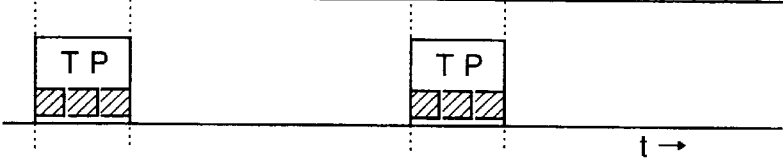
FIG.9F
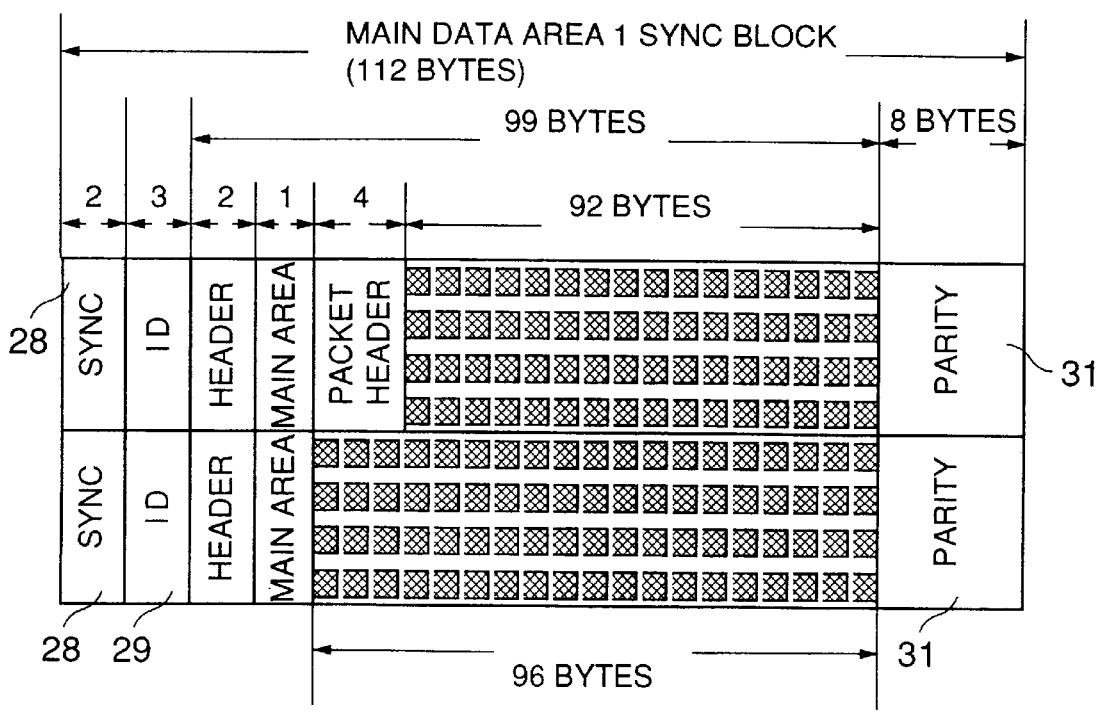
FIG.10

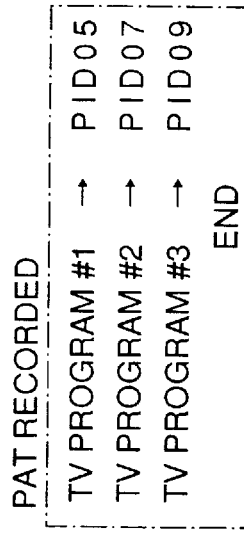
FIG.11A PAT ORIGINAL
TV PROGRAM #1 → PID 05
TV PROGRAM #2 → PID 07
TV PROGRAM #3 → PID 09
END
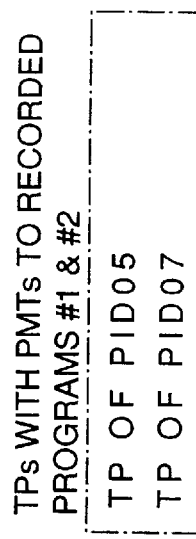
FIG.11B PAT RECORDED
TV PROGRAM #1 → PID 05
TV PROGRAM #2 → PID 07
TV PROGRAM #3 → PID 09
END
FIG.11C TPs WITH PMTs TO TV PROGRAMS #1 TO #3
TP OF PID 05
TP OF PID 07
TP OF PID 09
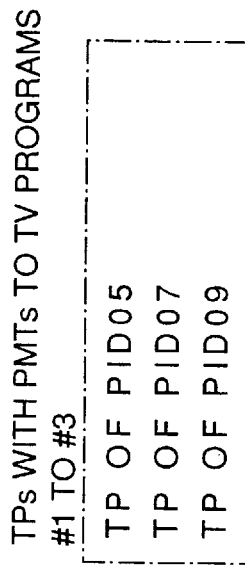
FIG.11D TPs WITH PMTs TO RECORDED PROGRAMS #1 & #2
TP OF PID 05
TP OF PID 07
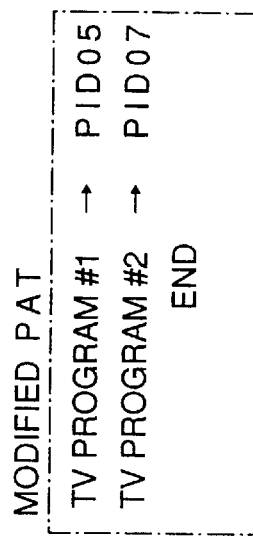
FIG.11E MODIFIED PAT
TV PROGRAM #1 → PID 05
TV PROGRAM #2 → PID 07
END

PAT ORIGINAL

TV PROGRAM #1 → PID05
TV PROGRAM #2 → PID07
TV PROGRAM #3 → PID09
END

MODIFIED PAT WHEN PROGRAMS
1 & #2 ARE TO BE RECORDED

TV PROGRAM #1 → PID05
TV PROGRAM #2 → PID07
END

TPs WITH PMTs TO PROGRAMS
1 & #2 TO BE RECORDED

TP OF PID05
TP OF PID07

APPARATUS AND METHOD OF RECEIVING BROADCASTED DIGITAL SIGNAL

BACKGROUND OF THE INVENTION

The present invention relates to an apparatus and a method of receiving a broadcasted digital signal. More specifically, this invention relates to receiving a broadcasted digital signals with bit streams of digital data conveying packets under time-division multiplexing, each packet at least having a packet of program specific information of a large number of TV programs and packets of the TV programs themselves.

TV programs have been broadcasted in digital waveform via communications satellite. A digital TV signal conveys a composite signal of highly efficiently compressed digital data of a large number of TV programs under time-division multiplexing.

In the TV broadcasting, a large number of TV programs are highly efficiently compressed by an MPEG-2 encoder to be transformed into transport packets (TPs). Each TP has 188 megabyte-digital data. The TPs are merged into a composite signal by time-division multiplexing to be a transport stream (TS). The transport streams are transmitted in parallel via transponders, the number of the TSs being equal to that of the transponders.

Each TP has a packet of program specific information (PSI) of a large number of TV programs for audience's easier tuning to one of the large number of TV programs. This packet is called a PSI packet in the specification. And the PSI packet has packets of program association table (PAT), program map table (PMT), conditional association table (CAT) and network information table (NIT).

Digital TV broadcasting waves with bit streams of digital data with at least the PSI packet and packets of TV programs themselves under time-division multiplexing are transmitted to a digital TV broadcasting wave receiving apparatus, or a set top box (STB). The packets of TV programs themselves are called program packets in the specification. The STB is tuned to one of the large number of TV programs with reception of the PSI packet.

A conventional STB is shown in FIG. 1 with a tuner 1, a digital demodulator and error corrector 2, a system controller 3, a program data analyzer 4, a demultiplexer 5, a video and audio MPEG decoder 6, a selection data input terminal 7, an adder 8 and an antenna 9.

A digital broadcasting wave signal received via antenna 9 is amplified by the tuner 1 with frequency conversion. The digital signal is then fed to the digital demodulator and error corrector 2. The digital signal is demodulated with bit error correction.

The error-corrected bit stream of the digital signal is applied to the demultiplexer 5 and program data analyzer 4. The analyzer 4 analyzes PSI in the bit stream to find TV program titles. More in detail, after termination of PMT recognition processing to recognize PMTs corresponding to all TV programs indicated by the PAT, the titles are output from an output terminal 10 via adder 8 to be displayed on a screen (not shown).

An audience enters data for selecting one TV program via selection data input terminal 7. This data is fed to the system controller 3 to find the program packets only for the selected one TV program among the packets fed to the demultiplexer 5. The program packets are then fed to the decoder 6 from demultiplexer 5. The decoder 6 decodes digital data of video and audio packets. The decoded video and audio analog signals are then output from the output terminal 10 via adder 8.

As disclosed above, the conventional STB outputs video and audio analog signals of one specific TV program that an audience wants to watch among received TV programs. The video and audio analog signals of the specific TV program are recorded to and reproduced from a helical scanning type video cassette recorder (VCR) or a video tape recorder for analog video signals.

The inventors have devoted to recording bit streams of the selected and other several non-selected TV programs output by the digital demodulator and error corrector 2 using a D-VHS (trade mark) type VCR.

This VCR installs mechanism of the present helical scanning type S-VHS type VCR in order to be compatible with the S-VHS type VCR. Because the helical scanning type VCR can be used as a storage of large capacity of digital data. Further, the D-VSH type VCR can record and reproduce bit streams of digital data supplied via digital interface.

The D-VHS type VCR can record the PSI packet and program packets of several TV programs among the large number of TV programs. However, the conventional STB does not accept such a reproduced signal of the PSI packet and program packets of several TV programs.

Because as disclosed above, after termination of PMT recognition processing to recognize PMTs corresponding to all (the large number of) TV programs indicated by the PAT, the program data analyzer 4 finds the TV program titles that are output from the output terminal 10 via adder 8 to be displayed on a screen (not shown). In other words, the program data analyzer 4 requires program packets of not only several TV programs that an audience wants to record but also all (the large number of) TV programs indicated by the PAT.

SUMMARY OF THE INVENTION

An object of the present invention is to provide an apparatus and a method of receiving a broadcasted digital signal using a conventional helical scanning type VCR for recording and reproducing one or several TV programs among a large number of TV programs conveyed by the broadcasted digital signal.

Another object of the present invention is to provide an apparatus and a method of receiving a broadcasted digital signal with program management using simple program specification subsidiary information.

The present invention provides an apparatus for receiving a broadcasted digital signal comprising: demodulating means for demodulating a digital TV broadcasting signal to obtain a bit stream containing at least a first packet of a first program specific information concerning all TV programs conveyed by the digital TV broadcasting signal and first packets of the TV programs themselves; entering means for entering selection data for selecting at least one of the TV programs; selecting means, responsive to the selection data, for selecting only second packets from among the first packets, the second packets containing only data of the selected TV program; decoding means for decoding the second packets; interface means for outputting the first packet and the second packets without decoding and accepting the output first packet and the second packets; and modifying means for modifying the first program specific information into a second program specific information concerning the selected at least one of the TV programs.

It is preferable to modify the first program specific information into the second program specific information after the output first packet and the second packets are accepted by the interface means.

It is further preferable to modify the first program specific information into the second program specific information before the first packet and the second packets are output from the interface means.

The present invention further provides an apparatus for receiving a broadcasted digital signal comprising: demodulating means for demodulating a digital TV broadcasting signal to obtain a bit stream containing at least a first packet of a first program specific information concerning all TV programs conveyed by the digital TV broadcasting signal and first packets of the TV programs themselves, the first program specific information having at least a program association table and a program map table; detecting means for detecting first packet numbers of the first packets by analyzing the first program specific information; entering means for entering selection data for selecting at least one of the TV programs; selecting means for selecting only second packets from among the first packets using second packet numbers in response to the selection data, the second packets having the second packet numbers and containing only data of the selected TV program; decoding means for decoding the second packets; interface means for outputting the first packet and the second packets without decoding and accepting the output first packet and the second packets; modifying means for modifying the first program specific information into a second program specific information concerning the selected at least one of the TV programs without modifying the program association table and the program map table, the second program specific information having specific packet numbers, the second packet numbers being rewritten into the specific packet numbers, and the first packet with the second program information and the second packets with the specific packet numbers being applied to the interface means; and analyzing means for analyzing the second program specific information using the specific packet numbers in response to the first packet accepted by the interface means to detect the second packet numbers, thus the detected second packet numbers being applied to the selecting means.

The present invention further provides a method of receiving a broadcasted digital signal comprising the steps of: demodulating a digital TV broadcasting signal to obtain a bit stream containing at least a first packet of a first program specific information concerning all TV programs conveyed by the digital TV broadcasting signal and first packets of the TV programs themselves; entering selection data for selecting at least one of the TV programs; selecting only second packets from among the first packets in response to the selection data, the second packets containing only data of the selected TV program; decoding the second packets; outputting the first packet and the second packets without decoding; accepting the output first packet and the second packets; and modifying the first program specific information into a second program specific information concerning the selected at least one of the TV programs.

The present invention further provides a method of receiving a broadcasted digital signal comprising the steps of: demodulating a digital TV broadcasting signal to obtain a bit stream containing at least a first packet of a first program specific information concerning all TV programs conveyed by the digital TV broadcasting signal and first packets of the TV programs themselves, the first program specific information having at least a program association table and a program map table; detecting first packet numbers of the first packets analyzing the first program specific information; entering selection data for selecting at least one of the TV programs; selecting only second packets from among the first packets using second packet numbers in response to the selection data, the second packets having the second packet numbers and containing only data of the selected TV program; decoding the second packets; outputting the first packet and the second packets without decoding; accepting the output first packet and the second packets; modifying the first program specific information into a second program specific information concerning the selected at least one of the TV programs without modifying the program association table and the program map table, the second program specific information having specific packet numbers, the second packet numbers being rewritten into the specific packet numbers, the first packets with the second program information and the second packets with the specific packet numbers being output without decoding; and analyzing the second program specific information using the specific packet numbers in response to the accepted first packet to detect the second packet numbers, the detected second packet numbers being used in selecting the second packets.

BRIEF DESCRIPTION OF DRAWINGS

FIGS. 9A to 9F are schematic drawings in explaining the apparatus shown in FIG. 2;

FIG. 10 shows a format of a main data area;

FIGS. 11A to 11E are schematic drawings in explaining the apparatus shown in FIG. 2;

DETAILED DESCRIPTION OF PREFERRED EMBODIMENTS

Figure 2:
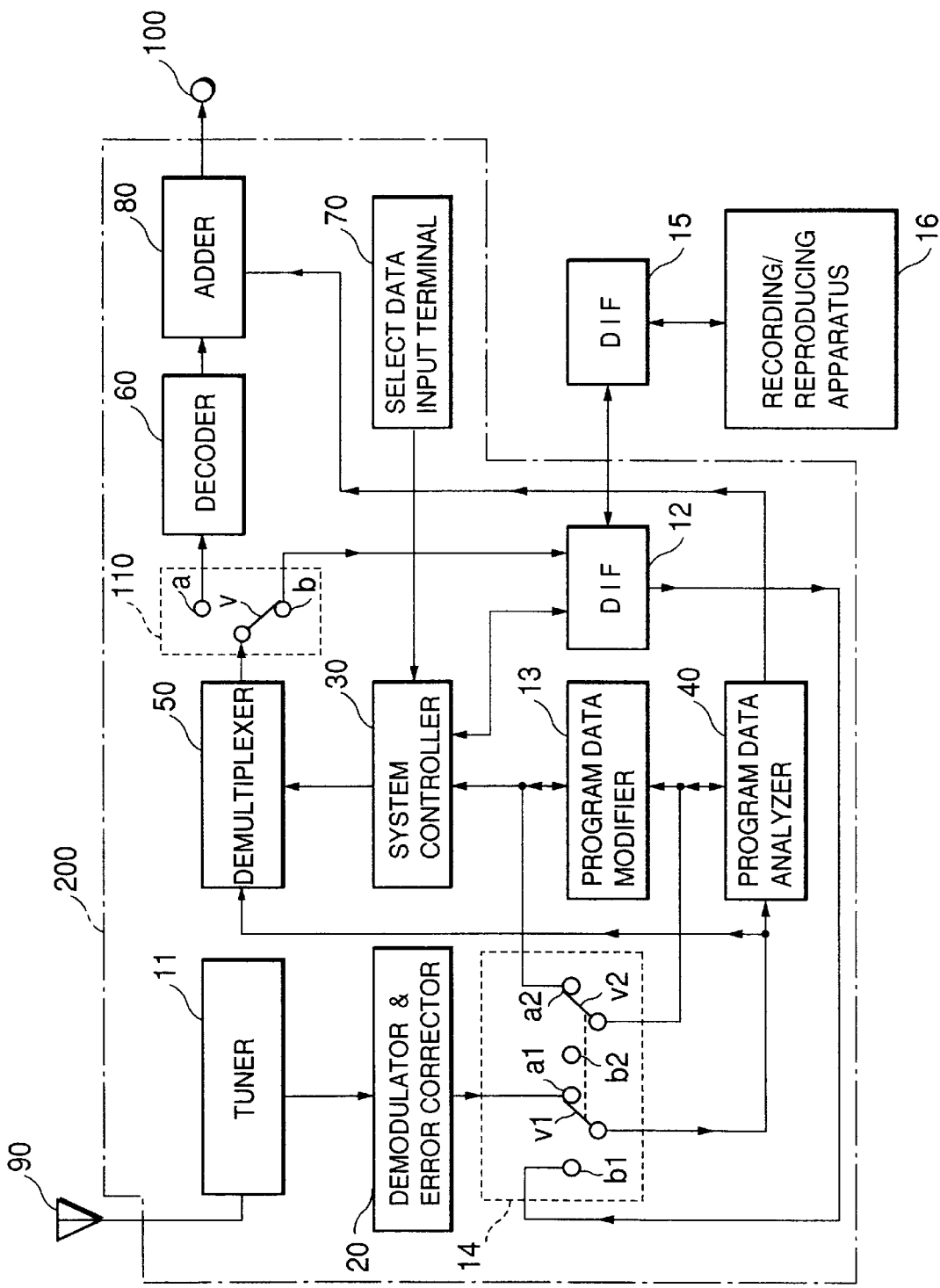
FIG. 2 is a block diagram of a first preferred embodiment of a broadcasted digital signal receiving apparatus according to the present invention.

A first preferred embodiment of the broadcasted digital signal receiving apparatus 200 according to the present invention is shown in FIG. 2 with a tuner 11, a digital demodulator and error corrector 20, a switch 14, a program data analyzer 40, a program data modifier 13, a system controller 30, a demultiplexer 50, a switch 110, a video and audio MPEG decoder 60, an adder 80, a selection data input terminal 70, a digital interface 12 and an antenna 90.

A digital recording/reproducing apparatus 16 is provided to be connected to the broadcasted digital signal receiving apparatus of the present invention via external digital interface 15 to record and reproduce bit streams of digital data.

Figure 1:
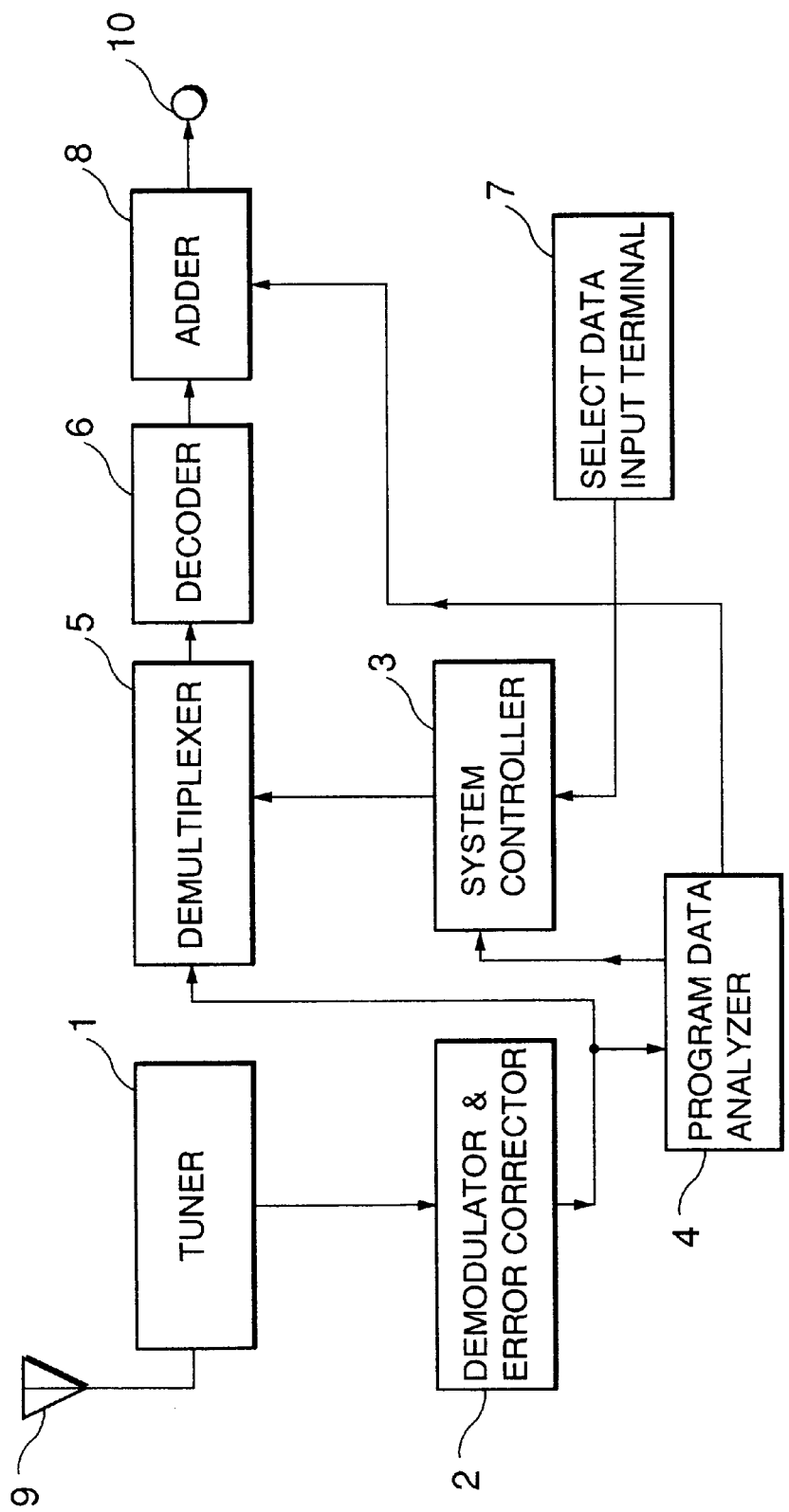
FIG. 1 is a block diagram of a conventional broadcasted digital signal receiving apparatus.

Like the conventional STB shown in FIG. 1, the broadcasted digital signal receiving apparatus 200 of FIG. 2 can be tuned to one of TV programs received via antenna 90 and decodes the one TV program by the decoder 60 to output the decoded analog signal via output terminal 100.

Not only this, the apparatus 200 of FIG. 2 can selects bit streams of digital data corresponding to several TV programs that an audience wants to watch among the bit streams of digital data including all (the large number of) TV programs fed by the digital demodulator and error corrector 20.

The selected bit streams can be output via digital interfaces 12 and 15, and recorded by the recording/reproducing apparatus 16. The recorded bit streams can be reproduced and fed to the apparatus of FIG. 2 to be decoded the same as disclosed above.

An operation mode of the apparatus shown in FIG. 2 is set by entering operation mode data via selection data input terminal 70, such as a keyboard and a mouse.

The operation mode data is fed to the system controller 30 that turns the switch 14 onto its contacts a1 and a2 sides, and the switch 110 onto its contact a side, respectively. This switch control is executed when the apparatus 200 of FIG. 2 is set in an operation mode where the apparatus is tuned to one of the TV programs conveyed by a digital broadcasting wave signal received via antenna 90.

The digital broadcasting wave signal conveys a large number of TV programs highly efficiently compressed by an MPEG-2 encoder and transformed into transport packets (TPs). Each TP has 188 megabytes of digital data. The TPs are merged into a composite signal by time-division multiplexing to be a transport stream (TS). The transport streams are transmitted in parallel via transponders, the number of the TSs being equal to that of the transponders.

Figure 3:
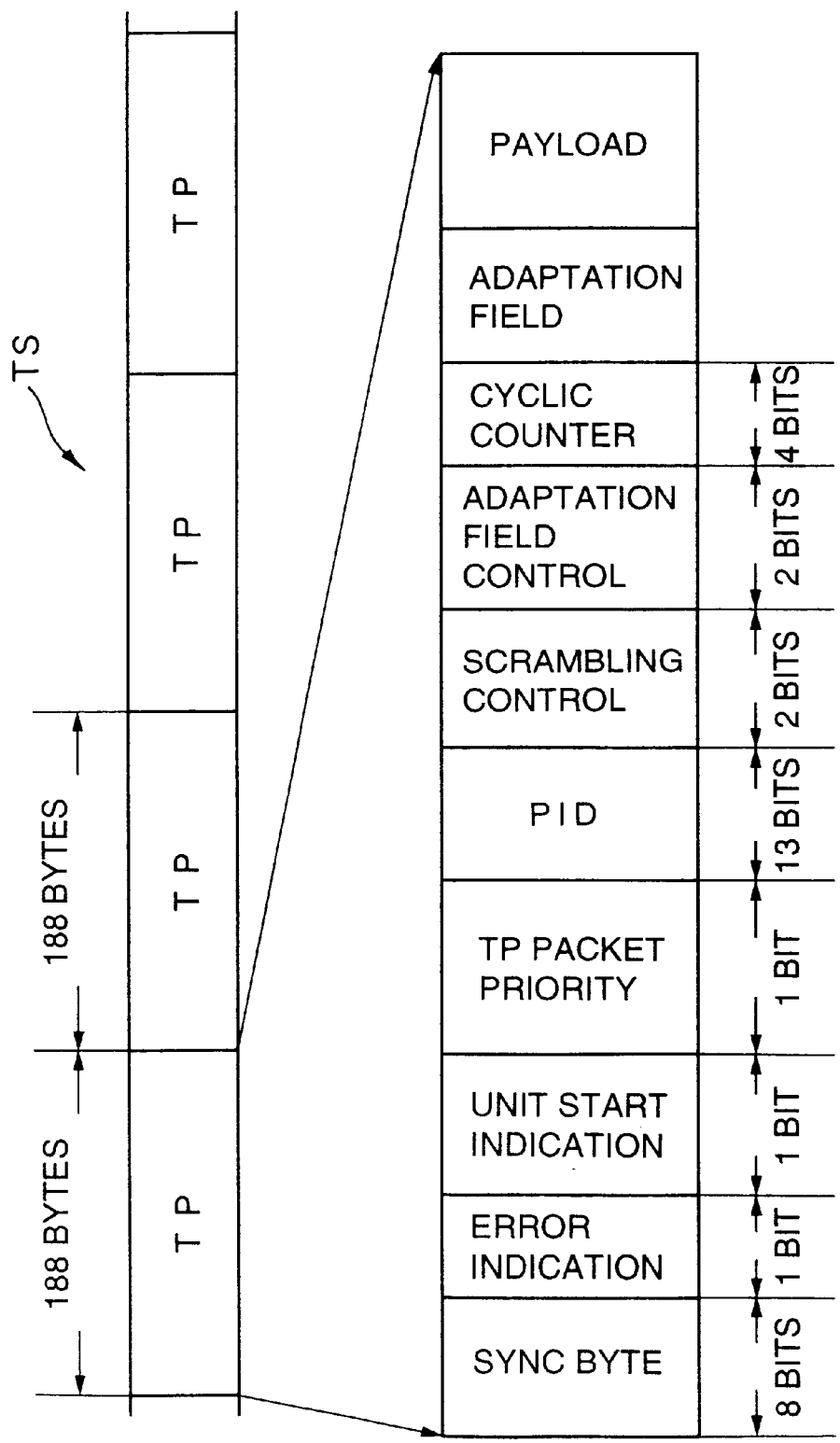
FIG. 3 shows a digital data format of a transport stream (TP)

FIG. 3 shows the structures of MPEG 2 transport stream (TS) of 188-megabyte transport packets (TPs) and each TP.

Figure 4:
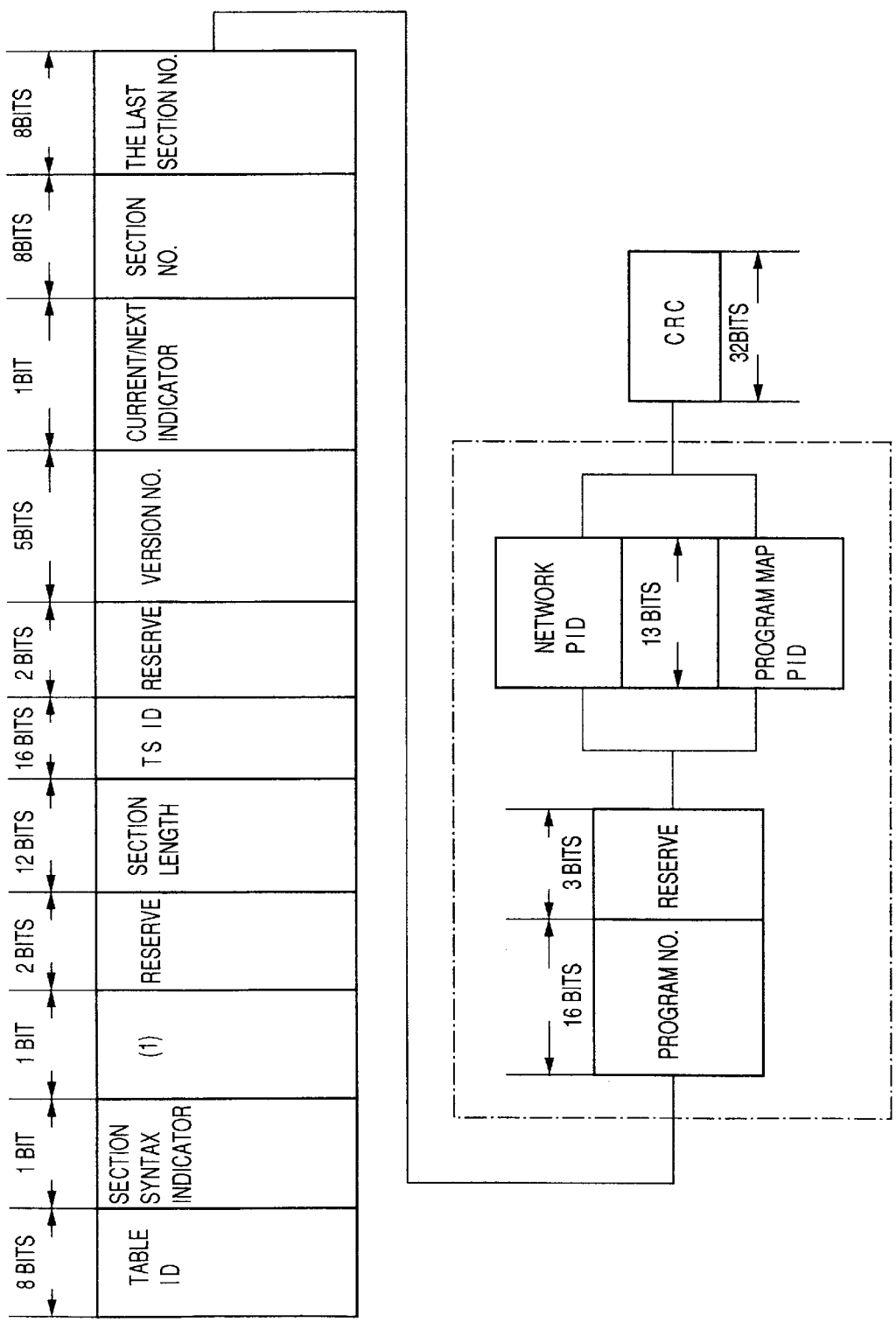
FIG. 4 shows a digital data format of a program association table (PAT)

Main data conveyed by one TP are: 8-bit synchronizing (SYNC) byte data required for the decoder 60 to detect the head of the TPs; 1-bit error indication data for indicating whether there is a bit error in the TP; and 13-bit packet identifier (PID) as a stream discrimination data that indicates an attribute of the bit stream of each TP. A transport packet with PID "0" is a program association table (PAT) as shown in FIG. 4.

Figure 5:
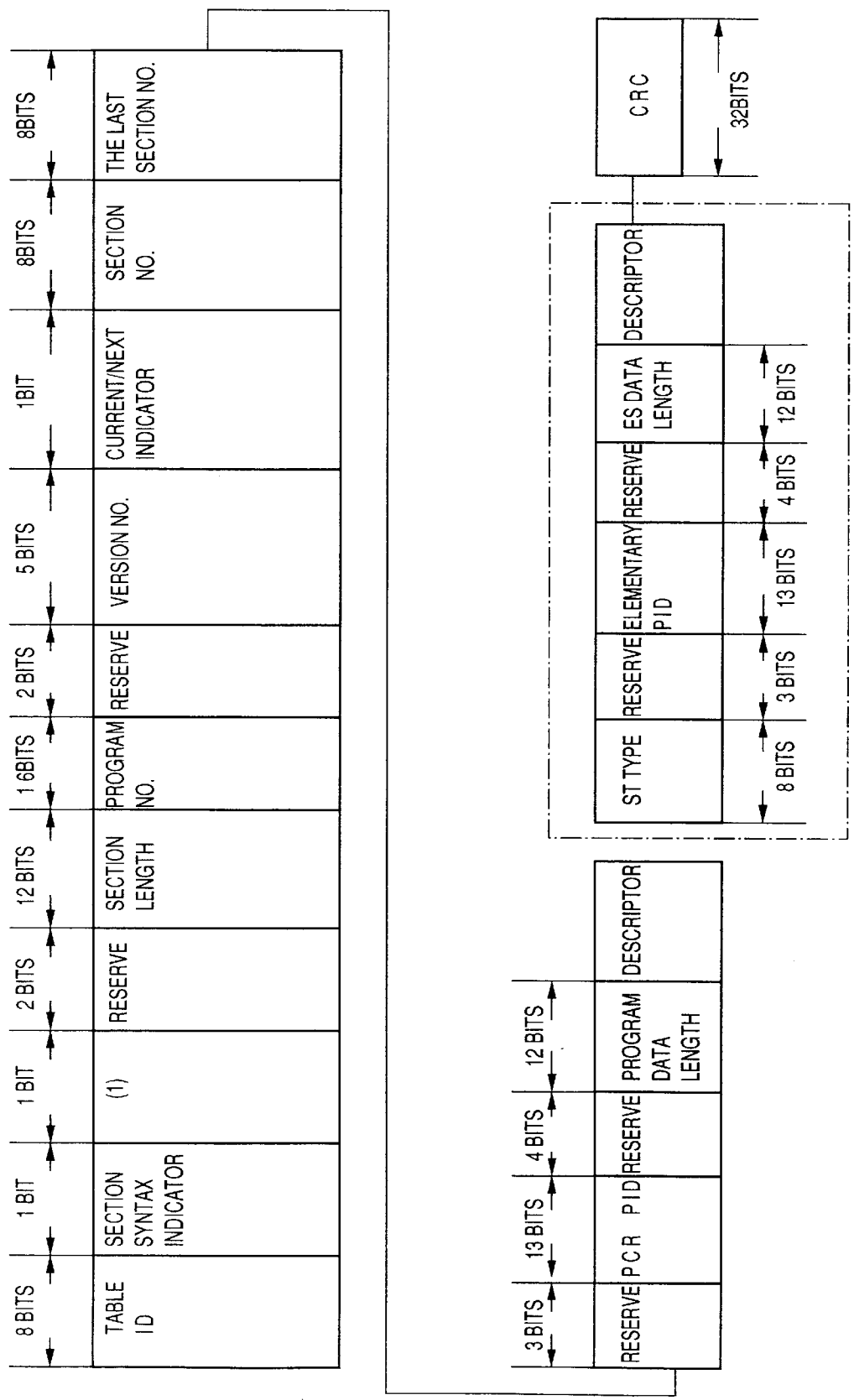
FIG. 5 shows a digital data format of a program map table (PMT)

The digital broadcasting wave signal conveys a PSI packet with program specific information (PSI) of TV programs. And the PSI packet contains PAT and program map table (PMT) as shown in FIG. 5.

The PAT and PMT are located in the area of a TP, the area called a payload in FIG. 3. In other TPs, data located in the payload are video and audio data of one TV program.

Figure 6:
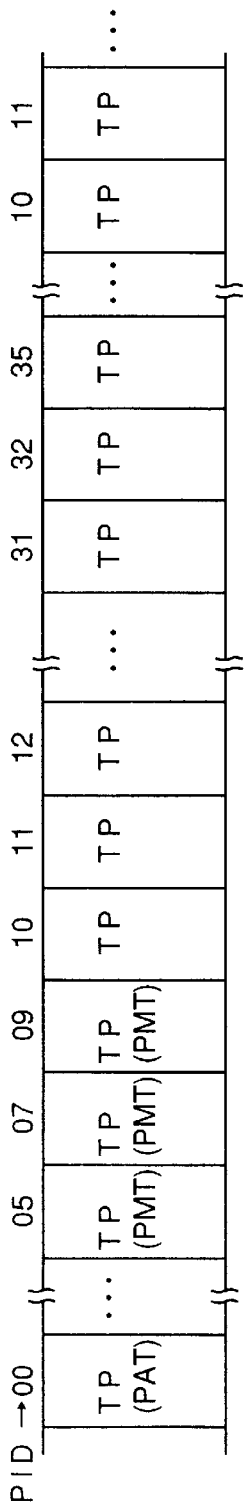
FIG. 6A shows a TP in explaining the apparatus shown in FIG. 2.
FIGS. 6B to 6E show a PAT and PMTs, respectively, in explaining the apparatus shown in FIG. 2.

Further, FIG. 6A shows: a TP(PAT) of PAT (FIG. 4) in the payload (FIG. 3), that is, a packet of PID "00"; TPs (PMT) of PMTs (FIG. 5) in the payload, that is, packets of PID "05", "07" and "09"; and TPs of video and audio data of TV program in the payload, that is, packets of PID "10", "11", "12", . . . , "31" and "32". These packets are merged into a data stream by time-division multiplexing.

FIG. 6B shows a PAT of three TV programs transmitted via one transponder. In the figure, TPs with PMTs of TV programs #1, #2 and #3 have PIDs "05", "07" and "09", respectively.

FIGS. 6C, 6D, and 6E show the PMTs of the TV programs #1, #2 and #3, respectively. More in detail, for example, FIG. 6C shows the. PMT indicating that TPs of audio data 1, audio data 2, video data and a program clock reference value (PCR) are located the PIDs "10", "11", "12" and "15", respectively. The same explanation goes to FIGS. 6D and 6E.

In FIG. 2, in the operation mode where the apparatus 200 is tuned to one of the TV programs conveyed by the digital broadcasting wave signal received via antenna 90, the digital signal is amplified by the tuner 11 with frequency conversion. The digital signal is then fed to the digital demodulator and error corrector 20. The digital signal is demodulated with bit error correction.

The error-corrected bit streams (digital data) is fed to the program data analyzer 40 and demultiplexer 50 via contacts a1 and v1 of the switch 14.

The program data analyzer 40 obtains TV program titles according to the PSI data of a plurality of TV programs in the error-corrected bit streams. The TV program titles are preferably arranged in the TP with a PMT as letter data or such TP of TV program titles is preferably indicated by a PID in PMT.

The TV program titles are output from the output terminal 100 via adder 80 and displayed on a screen (not shown). An audience refers to the displayed titles and enters data via selection data input terminal 70 to select a TV program.

In response to this data entry, the system controller 30 controls the demultiplexer 50 to output the packets that convey data of the selected one TV program. Since the switch 110 has been turned onto its contact a side, these packets are fed to the decoder 60 and transformed into video and audio analog signals. These analog signals of the selected TV program are output from the output terminal 100 via adder 80.

When the switch 110 is turned onto its contact b side by the system controller 30 as shown in FIG. 2, the bit streams of the packets that convey data of the selected one TV program are fed to the digital interface 12 from the demultiplexer 50. The bit streams are output from the digital interface 12 to the digital recording/reproducing apparatus 16 via external digital interface 15.

As already disclosed, a D-VHS type VCR can be used as the digital recording/reproducing apparatus 16. The D-VHS type VCR records digital data on a truck formed on a magnetic tape with a recording format as shown in FIG. 7 in response to 180-degree rotation of rotary magnetic heads.

Figure 7:
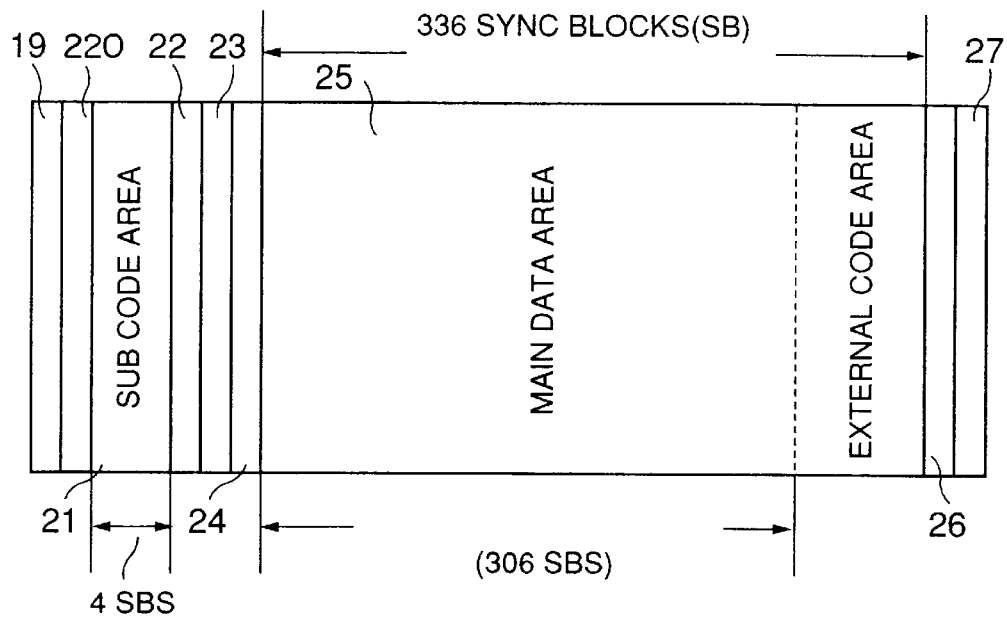
FIG. 7 shows a format of data recorded on a recording medium.

FIG. 7 shows the recording format on which aligned are a margin area 19, a preamble area 220, a sub code area 21, a post-amble area 22, an IBG area 23, a preamble area 24, a main data area 25, post-amble area 26 and a margin area 27. The main data area 25 consists of a data field and an error-correcting code field of 336 synchronous (SYNC) blocks with block numbers of 0 to 335. The data field is composed of 306 SYNC blocks (a multiple of 6). And the error-correcting code field stores an external code (C3 code) for error correction composed of 30 SYNC blocks.

Figure 8A:
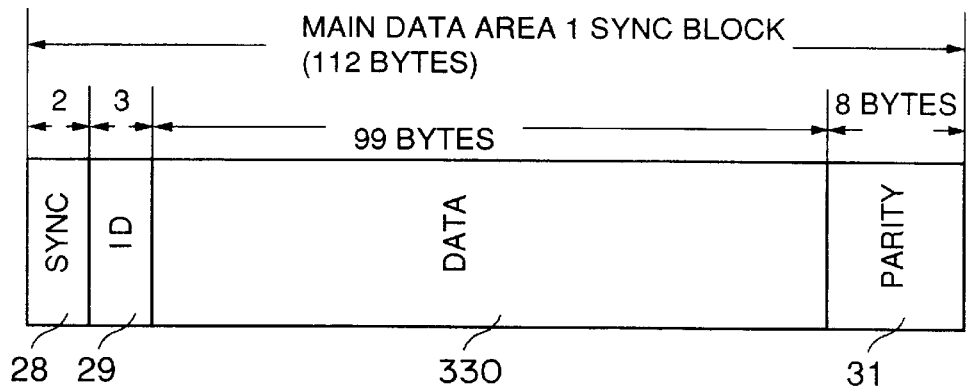
FIGS. 8A and 8B show formats of data contained in the data shown in FIG. 7.
Figure 8B:
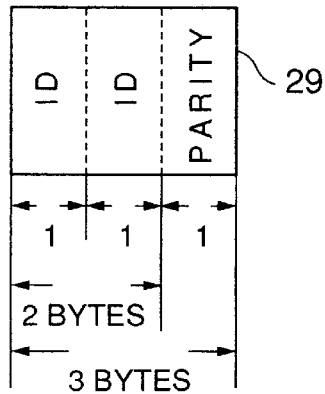

FIG. 8A shows a 112-byte SYNC block format of the main data area 25. Fields aligned on the format are a 2-byte synchronizing data area 28 for reproducing SYNC blocks, a 3-byte address information (ID) field 29, a 99-byte video or audio data store field 330 with a header and an 8-byte parity field 31 for error-correcting SYNC block data. As shown in FIG. 8B, the ID field 29 consists of a 1-byte parity and two 1-byte IDs for identifying 336 SYNC blocks and discriminating 6 trucks formed on a magnetic tape from each other.

Figure. 9A depicts the sequential TPs shown in FIG. 6A having different TV program data. FIG. 9B depicts the TPs on one specific TV program extracted from the TPs shown in FIG. 9A. FIGS. 9C and 9E depict reference clock signals for time measuring. FIG. 9D depicts TP arrangement stored in a recording medium where headers of the TPs shown in FIG. 9B is provided with time stamps indicating an arrival time of each TP. Further, FIG. 9F depicts a state where the TPs shown in FIG. 9D and reproduced from the recording medium are provided in original locations by means of the clock signals of FIGS. 9C and 9E and the time stamps of FIG. 9D. As disclosed, FIGS. 9A to 9F depict extraction of the TPs on one specific TV program. However, TPs on a plurality of TV programs also can be extracted from the data streams shown in FIG. 6A.

The main data area 25 shown in FIG. 7 has 306 SYNC blocks and each block contains 112-byte main data. And two sequential SYNC blocks of main data correspond to one 188-byte TP as shown in FIG. 10. A 99-byte data field 30 (FIG. 8A), of the upper block of the two sequential SYNC blocks shown in FIG. 10, consists of a 2-byte main header, a 1-byte main packet area, a 4-byte packet header and the remaining 92-byte area. And, another 99-byte data field 330 (FIG. 8A), of the lower block of the two sequential SYNC blocks shown in FIG. 10, consists of a 2-byte main header, a 1-byte main packet area and the remaining 96-byte area. As a result, one TP can be provided in the 188-byte area of the mesh-patterned upper 92- and lower 96-byte areas.

Again in FIG. 2, since the switch 14 has been turned onto its contacts a1 and a2 sides, the program data modifier 13 is short-circuited and hence the output of the program data analyzer 40 is directly fed to the system controller 30.

The disclosure below explains the case where two TV programs #1 and #2 are selected from three programs #1 to #3 with reference to FIGS. 11A to 11E.

FIG. 11A shows the PAT output by the digital demodulator and error corrector 20. And, FIG. 11B shows the same PAT recorded on a recording medium by the digital recording/reproducing apparatus 16.

As already disclosed, in the case of the conventional STB shown in FIG. 1, TPs with PMTs of PIDs "05", "07" and "09" of FIG. 11C corresponding to the TV programs #1 to #3 are also required to be recorded on the recording medium.

However, when the TV programs #1 and #2 are only selected, the TPs with PMTs of PIDs "05" and "07" are only recorded on the recording medium, without the TP with PMT of PID "09" corresponding to the TV program #3. Thus, the conventional STB of FIG. 1 is of no use in this case. Because the conventional STB requires all TPs with PMTs corresponding to the TV programs #1 to #3.

On the contrary, the apparatus 200 of FIG. 2 can decode and output the selected two TV programs #1 and #2.

Figure 12:
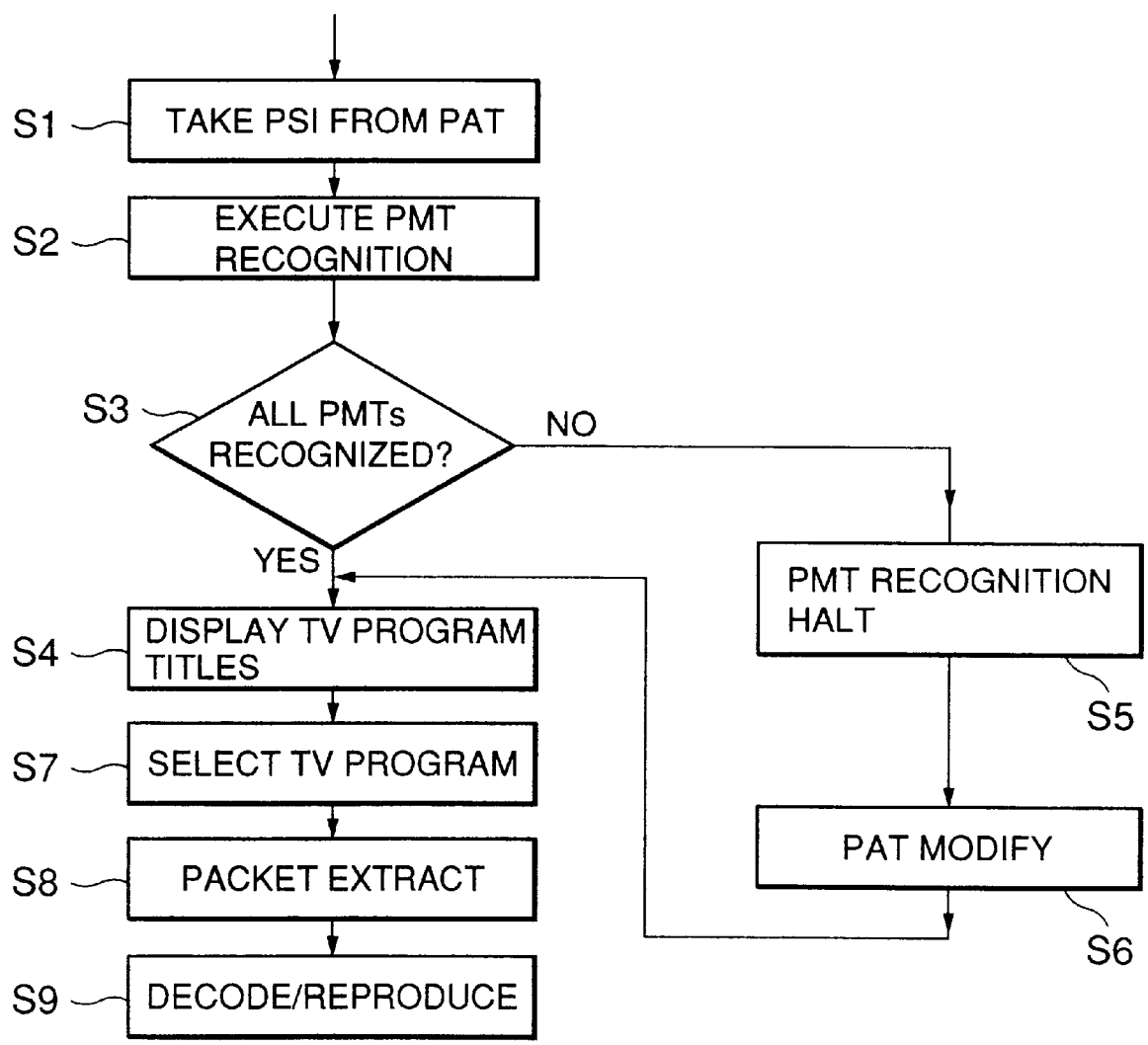
FIG. 12 is a flowchart explaining the apparatus shown in FIG. 2.

Because the recorded PAT shown in FIG. 11B is modified to the PAT shown in FIG. 11E by the program data modifier 13 according to the flowchart shown in FIG. 12.

In FIG. 2, the switches 14 and 110 are turned onto their contacts b1 and b2, and contact a sides, respectively, in the operation mode where the recorded digital data streams are fed to the program data analyzer 40 from the recording/reproducing apparatus 16 via digital interfaces 15 and 12.

On accepting the data streams, the program data analyzer 40 takes PSI from the PAT packets in STEP Si of FIG. 12. Next, in STEP S2, the analyzer 40 executes PMT recognition processing to recognize PMTs one by one corresponding to TV programs indicated by the PAT. Then, in STEP S3, checking is made if the PMTs corresponding to all TV programs are recognized. If so, the PMT recognition processing ends and the process goes to STEP S4. If not, however, the process goes to STEP S5. In STEP S5, the PMT recognition processing halts so as not to find an unrecognized PMT. And the process goes to STEP S6.

In STEP S6, the program data modifier 13 modifies the PAT of FIG. 11B conveyed by the reproduced data streams from the recording/reproducing apparatus 16 into a new PAT of FIG. 11E. The new PAT contains data concerning TV programs corresponding to the PMTs recognized by the program data analyzer 40 in STEP S2. Then, the process goes to STEP S4.

In STEP S4, the analyzer 40 outputs TV program titles that are output from output terminal 100 via adder 100 and displayed on a screen (not shown). Next, in STEP S7, an audience selects one of the TV programs with reference to the displayed titles and enters selection data via selection data input terminal 70. Then, the process goes to STEP S8.

In STEP S8, in response to the entered selection data, the system controller 30 designates and informs the demultiplexer 50 of packets containing data of the selected TV program. Then, the demultiplexer 50 extracts these packets from the reproduced packets. The extracted packets are decoded by the decoder 60 to output video and audio analog signals. The analog signals are output from the output terminal 100 via adder 80 in STEP S9.

Figures 13, 14A, 14B, 14C:
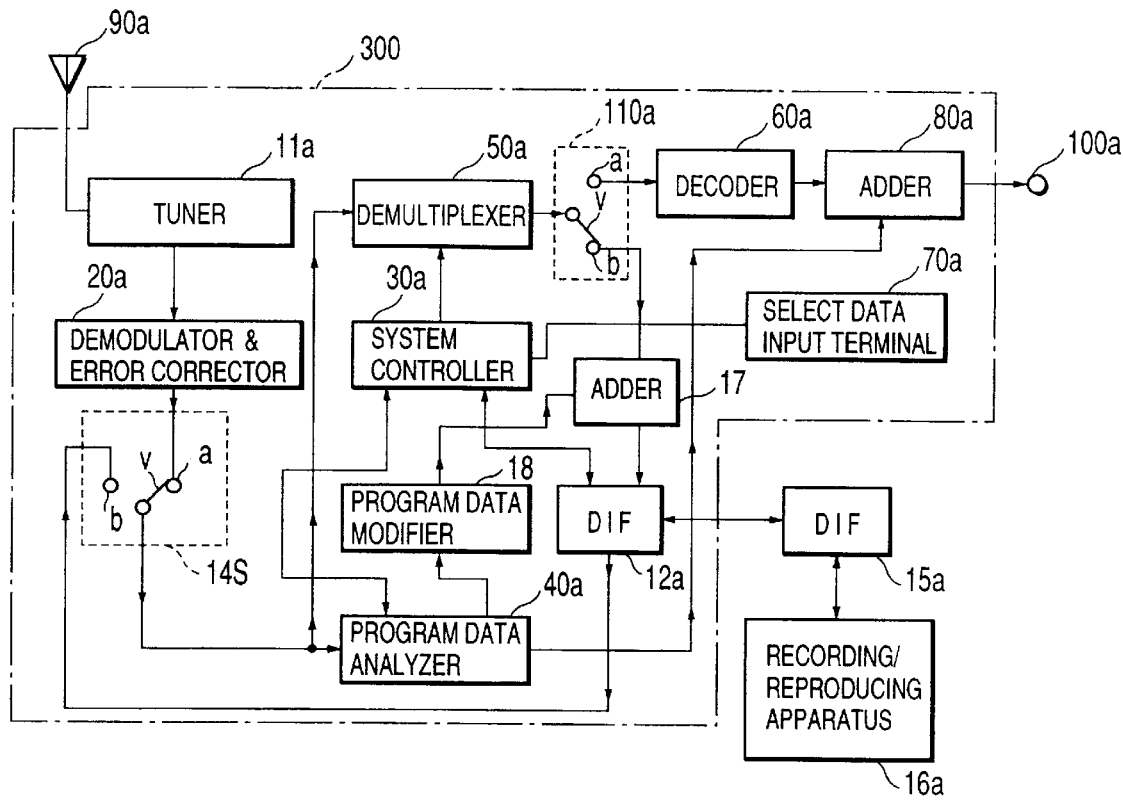
FIG. 13 is a block diagram of a second preferred embodiment of a broadcasted digital signal receiving apparatus according to the present invention.
FIGS. 14A to 14C are schematic drawings in explaining the apparatus shown in FIG. 13.
Figure 15:
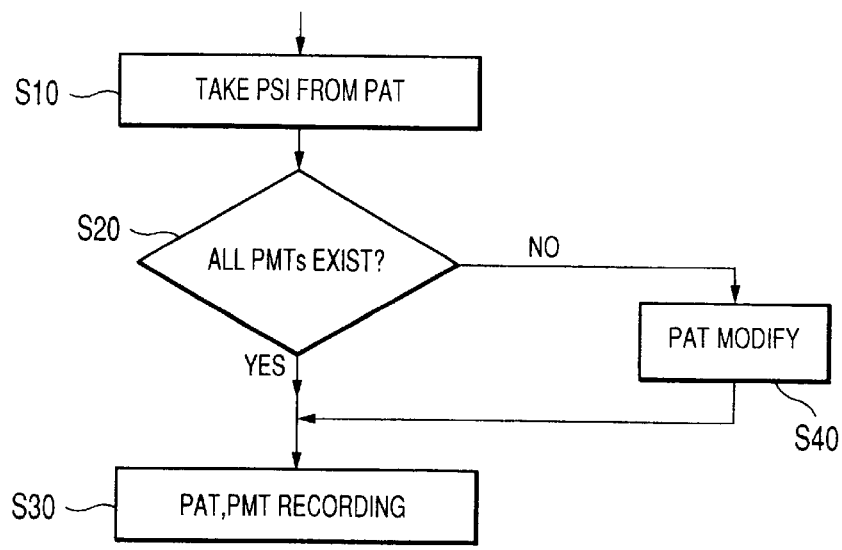
FIG. 15 is a flowchart explaining the apparatus shown in FIG. 13.

A second preferred embodiment of the broadcasted digital signal receiving apparatus 300 according to the present invention is shown in FIG. 13 with a tuner 11a, a digital demodulator and error corrector 20a, a switch 14s, a program data analyzer 40a, a program data modifier 18, a system controller 30a, a demultiplexer 50a, a switch 110a, a video and audio MPEG decoder 60a, adders 17 and 80a, a selection data input terminal 70a, a digital interface 12a and an antenna 90a.

Also in this embodiment, a digital recording/reproducing apparatus 16a is provided to be connected to the broadcasted digital signal receiving apparatus of the present invention via external digital interface 15a to record and reproduce bit streams of digital data.

The broadcasted digital signal receiving apparatus 300 of FIG. 13 also can be tuned to one of TV programs received via antenna 90a and decodes the one TV program by the decoder 60a to output the decoded analog signal via output Terminal 100a.

The apparatus 300 of FIG. 13 also can selects bit streams of digital data corresponding to several TV programs that an audience wants to watch among the bit streams of digital data including all (the large number of) TV programs fed by the digital demodulator and error corrector 13a.

The selected bit streams can be output via digital interfaces 12a and 15a, and recorded by the recording/ reproducing apparatus 16a. The recorded bit streams can be reproduced and fed to the apparatus 300 of FIG. 13.

An operation mode of the apparatus 300 shown in FIG. 13 is also set by entering operation mode data via selection data input terminal 70a.

The operation mode data is fed to the system controller 30a that turns the switches 14s and 110a onto their contacts a sides. This switch control is executed when the apparatus 300 of FIG. 13 is set in an operation mode where the apparatus is tuned to one of the TV programs conveyed by a digital broadcasting wave signal received via antenna 90a.

In this operation mode, the digital broadcasting wave signal received via antenna 90a is amplified by the tuner 11a with frequency conversion. The digital signal is then fed to the digital demodulator and error corrector 20a. The digital signal is demodulated with bit error correction.

The error-corrected bit streams (digital data) is fed to the program data analyzer 40a and demultiplexer 50a via contacts a and v of the switch 14s.

The program data analyzer 40a obtains TV program titles according to the PSI data of a plurality of TV programs in the error-corrected bit streams.

The TV program titles are output from the output terminal 100a via adder 80a and displayed on a screen (not shown.) An audience refers to the displayed titles and enters data via selection data input terminal 70a to select a TV program.

In response to this data entry, the system controller 30a controls the demultiplexer 50a to output the packets that conveys data of the selected one TV program. Since the switch 110a has been turned onto its contact a side, these packets are fed to the decoder 60a and transformed into video and audio analog signals. These analog signals of the selected TV program are output from the output terminal 100a via adder 80a.

Next, the switch 110a is turned onto its contact b side by the system controller 30a when the apparatus 300 of FIG. 13 is set in an operation mode where selected TV programs are recorded on a recording medium by the recording/reproducing apparatus 16a.

The disclosure below explains the case where two TV programs #1 and #2 are selected from three programs #1 to #3 with reference to FIGS. 14A to 14C, and FIG. 15.

In STEP S10, when the error-corrected bit streams (digital data) is fed to the program data analyzer 40a, the analyzer 40a takes PSI of TV programs #1, #2 and #3 from a PAT (FIG. 14A) in the bit streams.

In STEP S20, the program data analyzer 40a examines whether there are TPs with all PMTs corresponding to the TV programs #1, #2 and #3.

If there are, next in STEP S30, the PAT and PMTs are fed to the adder 17 via program data modifier 18 and added to the bit stream output from the demultiplexer 50a via switch 110a. Then, the bit stream with the PAT and PMTs are fed to the recording/reproducing apparatus 16a via digital interfaces 12a and 15a.

However, if there are TPs with PMTs corresponding to the selected TV programs #1 and #2 only (FIG. 14C) in STEP S30, next in STEP S40, the program data modifier 18 modifies the PAT into the one as shown in FIG. 14B. Then, the process goes to STEP S30.

The switches 14s and 110a are turned onto their contacts b and a sides, respectively, when the apparatus of FIG. 13 is set in an operation mode where the selected and recorded TV programs are reproduced by the recording/reproducing apparatus 16a.

The recorded bit streams are fed to the program data analyzer 40a from the recording/reproducing apparatus 16a via digital interfaces 15a and 12a. The program data analyzer 40a then outputs the TV program titles corresponding to the recorded TV programs. The TV program titles are output from the output terminal 100a via adder 80a and displayed on a screen (not shown.) An audience selects one of the TV programs with reference to the displayed titles and enters selection data via selection data input terminal 70a. In response to the selection data, the system controller 30a designates and informs of the demultiplexer 50a of the packets containing data of the selected TV program. Then, the demultiplexer 50a extracts these packets from the reproduced packets. The extracted packets are decoded by the decoder 60a to output video and audio analog signals. The analog signals are output from the output terminal 100a via adder 80a.

As disclosed above, the first embodiment is to modify PAT when reproduced by the recording/reproducing apparatus 16. On the other hand, the second embodiment is to modify PAT before recording.

Figure 16:
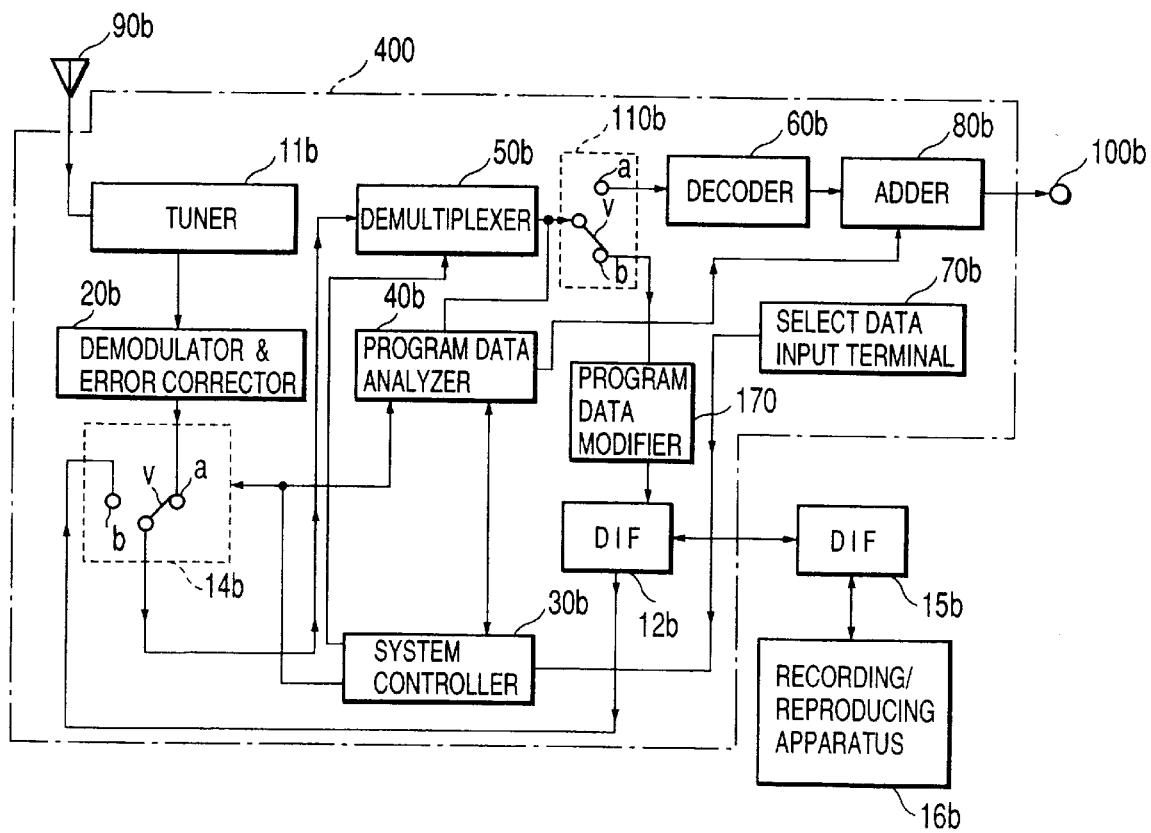
FIG. 16 is a block diagram of a third preferred embodiment of a broadcasted digital signal receiving apparatus according to the present invention.

A third preferred embodiment of the broadcasted digital signal receiving apparatus 400 according to the present invention is shown in FIG. 16 with a tuner 11b, a digital demodulator and error corrector 20b, a switch 14b, a program data analyzer 40b, a system controller 30b, a demultiplexer 50b, a switch 110b, a program data modifier 170, a video and audio MPEG decoder 60b, an adder 80b, a selection data input terminal 70b, a digital interface 12b and an antenna 90b.

Also in this embodiment, a digital recording/reproducing apparatus 16b is provided to be connected to the broadcasted digital signal receiving apparatus 400 of the present invention via external digital interface 15b to record and reproduce bit streams of digital data.

In FIG. 16, the switches 14b and 10b are turned onto their contacts a sides in the operation mode where the apparatus 400 is tuned to one of the TV programs conveyed by the digital broadcasting wave signal received via antenna 90b.

The digital signal is amplified by the tuner 11b with frequency conversion. The digital signal is then fed to the digital demodulator and error corrector 20b. The digital signal is demodulated with bit error correction.

The error-corrected bit streams (digital data) is fed to the demultiplexer 50b via contacts a and v of the switch 14b. The bit streams are fed from the demultiplexer 50b to the program data analyzer 40b that obtains TV program titles according to the PSI data of a plurality of TV programs in the error-corrected bit streams.

The TV program titles are output from the output terminal 100b via adder 80b and displayed on a screen (not shown.) An audience refers to the displayed titles and enters data via selection data input terminal 70b to select a TV program.

In response to this data entry, the system controller 30b controls the demultiplexer 50b to output the packets that conveys data of the selected one TV program. Since the switch 110b has been turned onto its contact a side, these packets are fed to the decoder 60b and transformed into video and audio analog signals. These analog signals of the selected TV program are output from the output terminal 100b via adder 80b.

The operation mode data is fed to the system controller 30b that turns the switch 110b onto its contact b side. This switch control is executed in the operation mode where the bit streams are recorded by the recording/reproducing apparatus 16b. The bit streams of the packets that conveys data of the selected one TV program is fed to the digital interface 12b from the demultiplexer 50b via switch 110b and program data modifier 170. The bit streams are output from the digital interface 12b to the digital recording/reproducing apparatus 16b via external digital interface 15b.

The switches 14b and 110b are turned onto their contacts b and a sides, respectively, in the operation mode where the recorded bit streams are reproduced and decoded. the recorded bit streams are reproduced and fed to the demultiplexer 50b from the recording/reproducing apparatus 16b via digital interfaces 15b and 12b and switch 14b.

The bit streams are fed from the demultiplexer 50b to the program data analyzer 40b that obtains TV program titles according to the PSI data of a plurality of TV programs in the error-corrected bit streams.

The TV program titles are output from the output terminal 100b via adder 80b and displayed on a screen (not shown.) An audience refers to the displayed titles and enters data via selection data input terminal 70b to select a TV program.

In response to this data entry, the system controller 30b controls the demultiplexer 50b to output the packets that conveys data of the selected one TV program. Since the switch 110b has been turned onto its contact a side, these packets are fed to the decoder 60b and transformed into video and audio analog signals. These analog signals of the selected TV program are output from the output terminal 100b via adder 80b.

Features of the third embodiment are as follows:
(1) In a mode of recording one TV program, instead of PAT and PMT as PSI, program specification subsidiary information (PSSI) is recorded as a specific PID packet. The PSSI defines PID of a default of each packet, for example, PID=1000.
(2) The PIDs of video, audio and data packets to be recorded are modified into new PIDs defined as defaults, for example, video packet's PID=1001, audio packet's PID=1002 and data packet's PID=1003. And,
(3) In reproduction, the PSSI in the specific PID packet is examined. When there are defaults, the video, audio and data packets are reproduced with PID=1001, PID=1002 and PID=1003, respectively.

Figure 17:
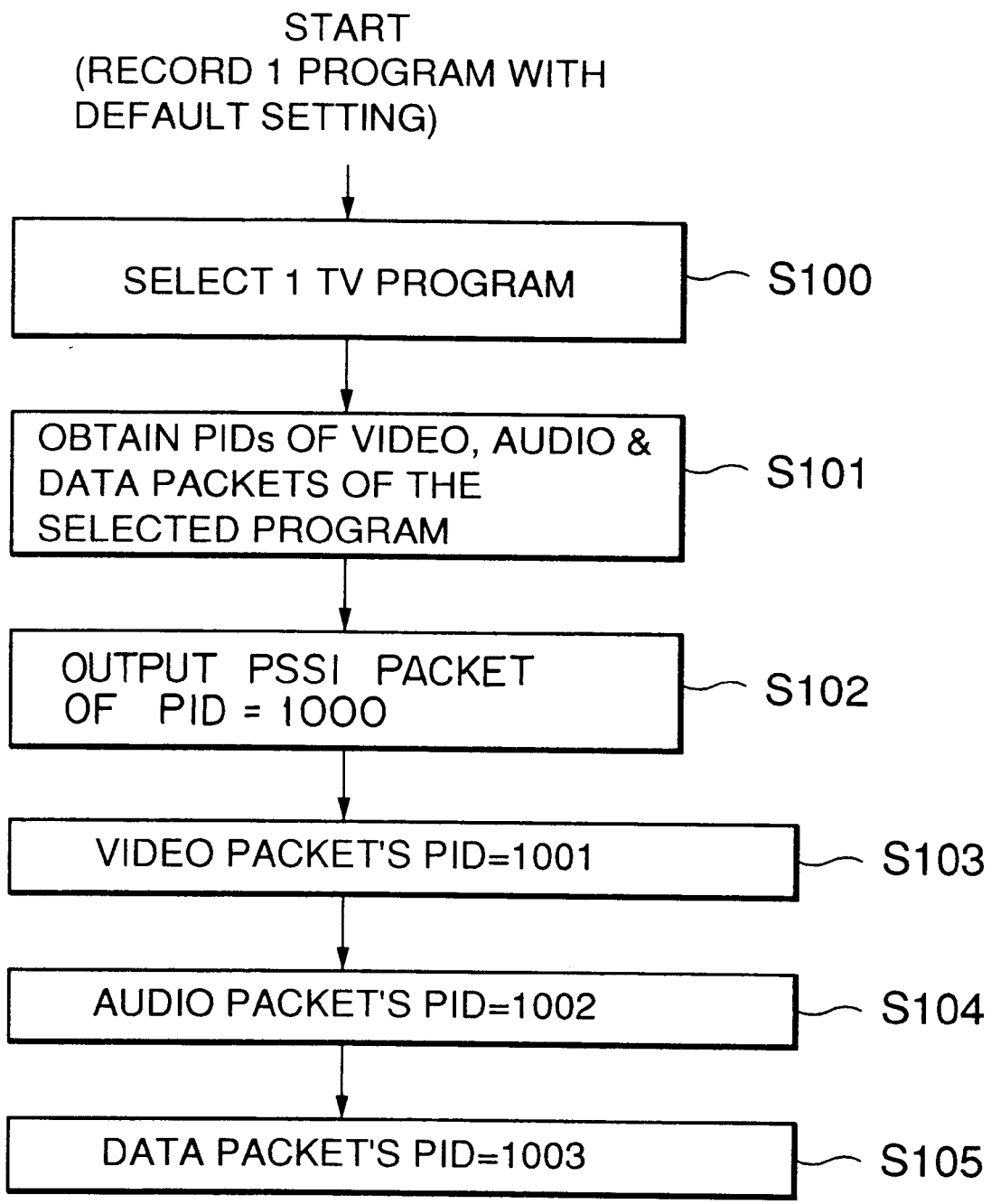
FIG. 17 is a flowchart explaining the apparatus shown in FIG. 16.

These processes are executed by the program data modifier 170 in recording and program data analyzer 40b in reproduction. The processes are disclosed below with reference to FIGS. 16 and 17.

First in recording one of TV programs, an audience enters selection data for a TV program 2, for example, via selection data input terminal 70b with reference to TV program titles displayed on a screen (not shown) in STEP S100

Figure 18:
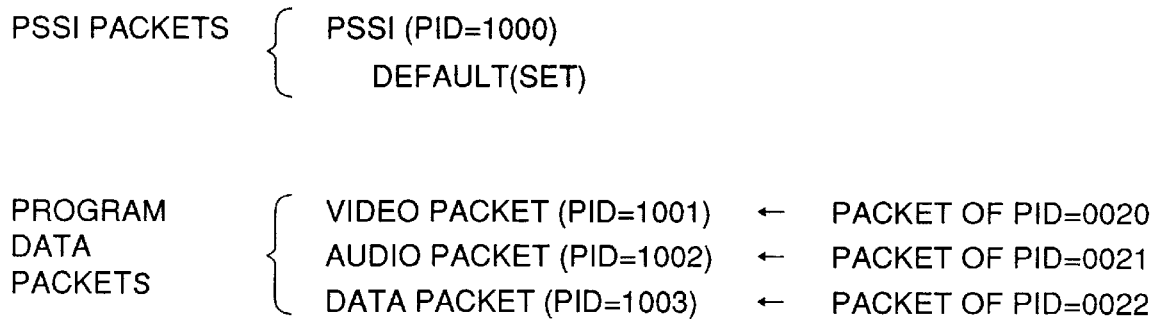
FIG. 18 shows structures of packets to be recorded output from the apparatus shown in FIG. 16.
Figure 19:
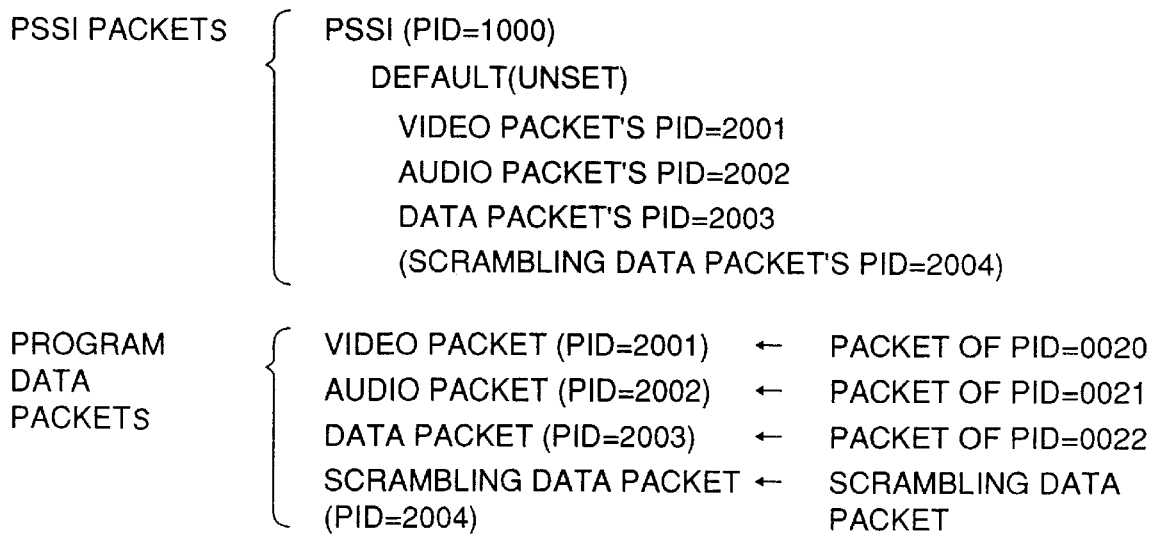
FIG. 19 shows other structures of packets to be recorded output from the apparatus shown in FIG. 16.

In STEP S101, in response to the selection data, the system controller 30b obtains the PIDs of video, audio and data packets from PSI fed from the program data analyzer 40b. These PIDs are fed to the demultiplexer 50b. The packets of the selected one TV program are only fed to the switch 110b, for example, with video packet's PID=0020, audio packet's PID=0021 and data packet's PID=0022 in the case of TV program 2 as shown in FIGS. 18 and 19. These TV program selection and packet transmission are executed using PSI with PAT and PMI.

Next in STEP S102, the packets are fed to the program data modifier 170 that forms packets with specific PID, such as PID=1000, instead of PAT and PMT as PSI corresponding to the received plurality of TV programs. New PSI is defined in the formed packets.

As shown in FIG. 18, the specific packets with PID=1000 is the PSSI. In the packets, the PIDs of video, audio and data packets are defined. Defined in the PSSI are video packet's PID=1001, audio packet's PID=1002 and data packet's PID=1003 as defaults with no PAT and PMT. That is, the PSSI packets have defaults only.

Next, PIDs of the TV program data are rewritten into PII)s of defaults. More specifically, the video, audio and data packets fed from the demultiplexer 50b to the program data modifier 170 via switch 110b are rewritten only their PIDs, that is, PID=1001 (STEP S103), PID=1002 (STEP S104) and PID=1003 (STEP S105), respectively.

The PSSI packets of PID=1000, and the video, audio and data packets of PID=1001, PID=1002 and PID=1003 are then fed to the recording/reproducing apparatus 16b via digital interfaces 12b and 15b to be recorded.

As disclosed above, in a mode of recording one TV program, recorded instead of PAT and PMT is PSSI as a specific PID packet in which defined are PIDs of defaults of video, audio and data packets. A specific TV program thus can be recorded without modification of PAT and PMT.

Not only the defaults as disclosed above, the PIDs of the video, audio and data packets are freely defined in the PSSI. As shown in FIG. 19, like PMT, default <unset>, video packet, PID=2001; audio packet, PID=2002; and data packet, PID=2003 are defined in PSSI of PID=1000. This method can be applied to recording not only one but a plurality of TV programs. And, further definition, such as, a packet of scrambling, PID=2004, can be defined in this method as shown in FIG. 19. FIG. 19 shows PSSI of PID=1000, however, not only limited to this, any PID can be defined as a unified PID.

Figure 20:
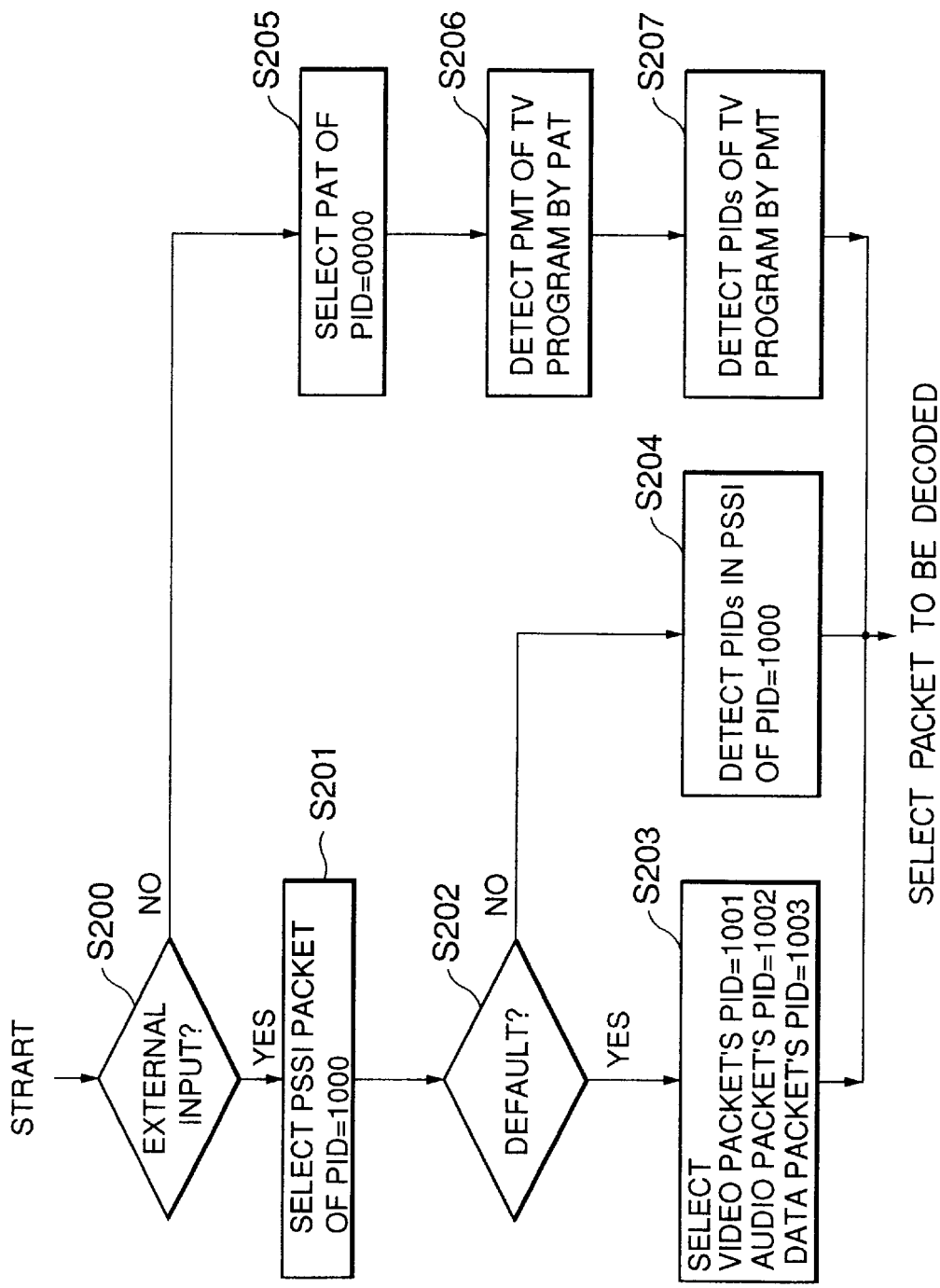
FIG. 20 is another flowchart explaining the apparatus shown in FIG. 16.

The apparatus 400 of FIG. 16 in a mode of reproducing the recorded TV program 2 is disclosed with reference to FIG. 20.

In reproduction, an audience selects external input via selection data input terminal 70b in STEP S200. Packets reproduced by the recording/reproducing apparatus 16b are then fed to the system controller 30b via digital interfaces 15b and 120b, and the switch 14b.

The system controller 30b controls the multiplexer 50b to select the PSSI packet of PID=1000 in STEP S201. The selected PSSI packet is then fed to the program data analyzer 40b.

The program data analyzer 40b analyzes the PSSI in STEP S202. When detected are PID=1001 of video packet, PID=1002 of audio packet and PID=1003 of data packet in default setting shown in FIG. 18, the process goes to STEP S203.

In STEP S203, the PID data is fed back to the system controller 30b that informs the demultiplexer 50b of the data as packet selection data. The demultiplexer 50b selects only the video packet (TV program content data packet) of PID=1001 and the audio packet (TV program content data packet) of PID=1002. The selected packets are fed to the decoder 60b. The TV program 2 is thus decoded and output from the output terminal 100b via adder 100b. The data packet of PID=1003 and the scrambling data of PID=1004 are also can be decoded and output or fed to a descrambler (not shown) as scrambling release data.

However, in STEP S202, when the default is not set as shown in FIG. 19, the program data analyzer 40b detects the PSSI packet of PID=1000 like PMT. Thus, in STEP S204, the video packet of PID=2001, audio packet of PID=2002 and data packet of PID=2003 are detected.

The PID data is fed back to the system controller 30b that informs the demultiplexer 50b of the data as packet selection data. The demultiplexer 50b selects only the video packet (TV program content data packet) of PID=2001 and the audio packet (TV program content data packet) of PID= 2002. The selected packets are feds to the decoder 60*b*. The TV program 2 corresponding to these PIDs is thus decoded and output from the output terminal 100*b* via adder 80*b*.

In the case of decoding a TV program to which the apparatus 400 of FIG. 16 is being tuned, the audience selects tuner input via election data input terminal 70*b* in STEP S200.

The system controller 30*b* controls the demultilplexer 50*b* to select PAT, such as, the one shown in FIG. 6B in STEP S205. This packet is then fed to the program data analyzer 40*b*.

The program data analyzer 40*b* analyzes the PAT to detect PIDs of PMT of each TV program in STEP S206. The PMT of each TV program is analyzed through processing of the system controller 30*b* and demultiplexer 50*b* to detect the PIDs of the video and audio packets of each TV program in STEP S207. These packets are then decoded and output.

The third embodiment is disclosed as above in recording and external input modes. Here, the recording mode means that non-decoded packets are output for recording besides decoding. The recording and decoding can be simultaneously executed. The external input mode means non-received packets (without via tuner 11*b*) are input to the apparatus 400 of FIG. 16 from an apparatus, such as the recording/reproducing apparatus 16*b*.

Although not shown through the drawings, when operation mode data is entered via selection data input terminal, a control signal is fed from the system controller to the switches to be turned on. In modes of recording and reproducing to and from an external recording/reproducing apparatus, a control signal can be sent from the recording/reproducing apparatus to the system controller via digital interfaces. The control signal transmission can be synchronized with a recording or reproducing operation.

As disclosed above, according to the present invention, a conventional helical scanning type VCR can be used for recording and reproducing one or, several TV programs among a large number of TV programs conveyed by a digital broadcasting wave signal.

Further, program management with simple PSSI is achieved in recording/reproducing one or more TV programs conveyed by digital TV broadcasting waves.

What is claimed is:

1. An apparatus for receiving a broadcasted digital signal comprising:

demodulating means for demodulating a digital TV broadcasting signal to obtain a bit stream containing at least a first packet of a first program specific information concerning all TV programs conveyed by the digital TV broadcasting signal and first packets of the TV programs themselves;

entering means for entering selection data for selecting at least one of the TV programs with reference to the first program specific information;

selecting means, responsive to the selection data, for selecting only second packets from among the first packets, the second packets containing only data of the selected TV program;

decoding means for decoding the second packets;

interface means for outputting the first packet and the second packets without decoding and accepting the output first packet and the second packets; and modifying means for modifying the first program specific information into a second program specific information concerning the selected at least one of the TV programs wherein, the second packets are selected before the first program specific information is modified into the second program specific information.

2. The apparatus of claim 1, wherein the modifying means modifies the first program specific information into the second program specific information before the first packet and the second packets are output from the interface means.

3. An apparatus for receiving a broadcasted digital signal comprising:

demodulating means for demodulating a digital TV broadcasting signal to obtain a bit stream containing at least a first packet of a first program specific information concerning all TV programs conveyed by the digital TV broadcasting signal and first packets of the TV programs themselves, the first program specific information having at least a program association table and a program map table;

detecting means for detecting first packet numbers of the first packets by analyzing the first program specific information;

entering means for entering selection data for selecting at least one of the TV programs;

selecting means for selecting only second packets from among the first packets using second packet numbers in response to the selection data, the second packets having the second packet numbers and containing only data of the selected TV program;

decoding means for decoding the second packets;

interface means for outputting the first packet and the second packets without decoding and accepting the output first packet and the second packets;

modifying means for modifying the first program specific information into a second program specific information concerning the selected at least one of the TV programs without modifying the program association table and the program map table, the second program specific information having specific packet numbers, the second packet numbers being rewritten into the specific packet numbers, and the first packet with the second program information and the second packets with the specific packet numbers being applied to the interface means; and analyzing means for analyzing the second program specific information using the specific packet numbers in response to the first packet accepted by the interface means to detect the second packet numbers, thus the detected second packet numbers being applied to the selecting means.

4. A method of receiving a broadcasted digital signal comprising the steps of:

demodulating a digital TV broadcasting signal to obtain a bit stream containing at least a first packet of a first program specific information concerning all TV programs conveyed by the digital TV broadcasting signal and first packets of the TV programs themselves;

entering selection data for selecting at least one of the TV programs with reference to the first program specific information;

selecting only second packets from among the first packets in response to the selection data, the second packets containing only data of the selected TV program;

decoding the second packets;

outputting the first packet and the second packets without decoding;

accepting the output first packet and the second packets; and modifying the first program specific information into a second program specific information concerning the selected at least one of the TV programs wherein, the second packets are selected before the first program specific information is modified into the second program specific information.

5. The method of claim 4, wherein the modifying step include the step of modifying the first program specific information into the second program specific information before the first packet and the second packets are output.

6. A method of receiving a broadcasted digital signal comprising the steps of:

demodulating a digital TV broadcasting signal to obtain a bit stream containing at least a first packet of a first program specific information concerning all TV programs conveyed by the digital TV broadcasting signal and first packets of the TV programs themselves, the first program specific information having at least a program association table and a program map table;

detecting first packet numbers of the first packets analyzing the first program specific information;

entering selection data for selecting at least one of the TV programs;

selecting only second packets from among the first packets using second packet numbers in response to the selection data, the second packets having the second packet numbers and containing only data of the selected TV program;

decoding the second packets;

outputting the first packet and the second packets without decoding;

accepting the output first packet and the second packets;

modifying the first program specific information into a second program specific information concerning the selected at least one of the TV programs without modifying the program association table and the program map table, the second program specific information having specific packet numbers, the second packet numbers being rewritten into the specific packet numbers, the first packets with the second program information and the second packets with the specific packet numbers being output without decoding; and analyzing the second program specific information using the specific packet numbers in response to the accepted first packet to detect the second packet numbers, the detected second packet numbers being used in selecting the second packets.

7. An apparatus for receiving a broadcasted digital signal comprising:

demodulating means for demodulating a digital TV broadcasting signal to obtain a bit stream containing at least a first packet of a first program specific information concerning all TV programs conveyed by the digital TV broadcasting signal and first packets of the TV programs themselves;

entering means for entering selection data for selecting at least one of the TV programs;

selecting means, responsive to the selection data, for selecting only second packets from among the first packets, the second packets containing only data of the selected TV program;

decoding means for decoding the second packets;

interface means for outputting the first packet and the second packets without decoding and accepting the output first packet and the second packets; and modifying means for modifying the first program specific information into a second program specific information concerning the selected at least one of the TV programs after the output first packet and the second packets are accepted by the interface means.

8. A method of receiving a broadcasted digital signal comprising the steps of:

demodulating a digital TV broadcasting signal to obtain a bit stream containing at least a first packet of a first program specific information concerning all TV programs conveyed by the digital TV broadcasting signal and first packets of the TV programs themselves;

entering selection data for selecting at least one of the TV programs;

selecting only second packets from among the first packets in response to the selection data, the second packets containing only data of the selected TV program;

decoding the second packets;

outputting the first packet and the second packets without decoding;

accepting the output first packet and the second packets; and modifying the first program specific information into a second program specific information concerning the selected at least one of the TV programs after the output first packet and the second packets are accepted.

* * * * *